United States Patent
Smallwood

(10) Patent No.: US 11,517,030 B2
(45) Date of Patent: Dec. 6, 2022

(54) USE OF EDIBLE-OIL-PROCESSING SPENT BLEACHING EARTH IN FORMULATING POULTRY AND LIVESTOCK FEED PRODUCTS

(71) Applicant: Norman J. Smallwood, Plano, TX (US)

(72) Inventor: Norman J. Smallwood, Plano, TX (US)

( * ) Notice: Subject to any disclaimer, the term of this patent is extended or adjusted under 35 U.S.C. 154(b) by 0 days.

(21) Appl. No.: 15/555,660

(22) PCT Filed: Mar. 4, 2016

(86) PCT No.: PCT/US2016/020969
§ 371 (c)(1),
(2) Date: Sep. 5, 2017

(87) PCT Pub. No.: WO2016/144788
PCT Pub. Date: Sep. 15, 2016

(65) Prior Publication Data
US 2018/0042268 A1 Feb. 15, 2018

Related U.S. Application Data

(60) Provisional application No. 62/129,078, filed on Mar. 6, 2015.

(51) Int. Cl.
*A23K 50/75* (2016.01)
*A23K 20/28* (2016.01)
(Continued)

(52) U.S. Cl.
CPC ............. *A23K 20/28* (2016.05); *A23K 20/10* (2016.05); *A23K 40/00* (2016.05); *A23K 50/75* (2016.05)

(58) Field of Classification Search
CPC ........ A23K 10/40; A23K 20/22; A23K 20/24; A23K 40/20; A23K 50/10; A23K 20/28; A23K 40/00; A23K 50/75; A23K 20/10
See application file for complete search history.

(56) References Cited

U.S. PATENT DOCUMENTS 3,687,680 A    8/1972   Krchnavi et al.
3,802,394 A    4/1974   Mahler
(Continued)

FOREIGN PATENT DOCUMENTS

EP    0878131 A2    11/1998
EP    0878131 A3    9/1999
(Continued)

OTHER PUBLICATIONS

ASTM C706-13, Standard Specification for Limestone for Animal Feed Use, ASTM International, published Jan. 2014. (Year: 2014).*
(Continued)

*Primary Examiner* — W A Moore
(74) *Attorney, Agent, or Firm* — McKee, Voorhees & Sease, PLC

(57) ABSTRACT

The present invention provides a novel method for disposing of spent bleaching earth that is economically beneficial and avoids the problems typically associated with its disposal. By adding fine-particle lime (calcium carbonate) to the spent bleaching earth discharged from the process filters, spontaneous combustion can be eliminated. The material can then be transported in solid form to a production facility for use as a nutritious ingredient in making a wide range of feed products for poultry and livestock.

7 Claims, 4 Drawing Sheets

Proposed Method for Spent Edible Oil Bleaching Earth Utilization

(51) Int. Cl.
*A23K 40/00* (2016.01)
*A23K 20/10* (2016.01)

(56) References Cited

U.S. PATENT DOCUMENTS

| | | | |
|---|---|---|---|
| 4,205,514 A | | 6/1980 | Wolrab |
| RE31,267 E | * | 6/1983 | Edgar .................... C10G 25/00 |
| | | | 106/284.02 |
| 4,970,080 A | * | 11/1990 | Laurent ................. A61K 33/06 |
| | | | 424/684 |
| 4,996,065 A | * | 2/1991 | Van de Walle ........ A23K 40/25 |
| | | | 426/454 |
| 5,817,352 A | | 10/1998 | Watson et al. |
| 6,027,755 A | * | 2/2000 | Henderson ............... B01J 20/12 |
| | | | 426/253 |
| 6,126,985 A | | 10/2000 | Cox |
| 6,436,453 B1 | * | 8/2002 | van Lengerich ..... A23C 9/1322 |
| | | | 426/103 |
| 2002/0068118 A1 | | 6/2002 | Gombos et al. |
| 2006/0005750 A1 | * | 1/2006 | Stowe, Jr. ............... C10L 10/04 |
| | | | 110/345 |
| 2006/0254077 A1 | | 11/2006 | Johal |
| 2007/0286913 A1 | * | 12/2007 | Swain .................... A61K 36/48 |
| | | | 424/738 |
| 2008/0311226 A1 | * | 12/2008 | Yamka .................. A61K 33/06 |
| | | | 424/684 |
| 2012/0114829 A1 | * | 5/2012 | Freemantle ........... A23K 40/10 |
| | | | 426/623 |
| 2013/0136827 A1 | * | 5/2013 | Drouillard ........... A23K 1/1813 |
| | | | 426/74 |
| 2014/0044834 A1 | | 2/2014 | Ortiz Niembro et al. |
| 2014/0356483 A1 | | 12/2014 | Smallwood |

FOREIGN PATENT DOCUMENTS

| | | |
|---|---|---|
| JP | 690674 | 4/1994 |
| JP | 2008237153 A * | 10/2008 |
| WO | 2013052357 A2 | 4/2013 |
| WO | WO-2013052357 A2 * | 4/2013 ........... A23K 1/1756 |
| WO | 20160144788 A1 | 9/2016 |

OTHER PUBLICATIONS

Zschu, "Spent Bleaching Earth-Practical Solutions," INFORM, vol. 5, No. 12, pp. 1375-1379. Dec. 31, 1994.

Smallwood, Norman J., "Notification of Transmittal of the International Search Report and the Written Opinion of the International Searching Authority, or the Declaration," 9 pages, dated May 17, 2016.

Al-Zubaidy, "Evaluation of spent bleaching and filtering clay—a bentonite product from palm oil refining as a potential feed ingredient in layer diets" Animal Feed Science and Technology, pp. 13-19. Dec. 1, 1992.

Smith, T. K. "Spent Canola Oil Bleaching Clays: Potential for Treatment of T-2 Toxicosis in Rats and Short-Term Inclusion in Diets for Immature Swine", Can. J. Anim. Sci, vol. 64, pp. 725-732, Sep. 30, 1984.

* cited by examiner

| Typical Analyses | | |
|---|---|---|
| Magnesium (Mg) | 0.145 | % |
| Silicon (Si) | 0.09 | % |
| Silica (SiO$_2$) | 0.20 | % |
| Iron (Fe) | 0.047 | % |
| Sodium (Na) | 0.030 | % |
| Potassium (K) | 0.012 | % |
| Sulfur (S) | 0.799 | % |
| Manganese (Mn) | 0.014 | % |
| Phosphorus (P) | 0.004 | % |
| Chloride (Cl) | 0.005 | % |
| Chromium (Cr) | 6 | ppm |
| Aluminum (Al) | 78 | ppm |
| Boron (B) | 11 | ppm |
| Barium (Ba) | <5 | ppm |
| Lead (Pb) | <5 | ppm |
| Nickel (Ni) | <5 | ppm |
| Cobalt (Co) | <5 | ppm |
| Copper (Cu) | 7 | ppm |
| Zinc (Zn) | 70 | ppm |
| Cadmium (Cd) | <5 | ppm |
| Iodine (I) | 7 | ppm |
| Arsenic (As) | <5 | ppm |
| Beryllium (Be) | <5 | ppm |
| Selenium (Se) | 0.181 | ppm |
| Mercury (Hg) | <0.050 | ppm |
| Vanadium (V) | <5 | ppm |
| Molybdenum (Mo) | <5 | ppm |
| Fluorine (F) | <1 | ppm |
| Bismuth (Bi) | <5 | ppm |
| Antimony (Sb) | <5 | ppm |

*FIG. 3B*

| Particle Distribution - U.S. Screen Comparison | | | |
|---|---|---|---|
| 14 X 200 mach product | | | |
| Micron Size | U.S. Screen | % Retained | % Passing |
| 2000 | 10 | 0.1 | 99.9 |
| 1700 | 12 | 0.2 | 99.7 |
| 1400 | 14 | 1.7 | 98.0 |
| 1180 | 16 | 4.2 | 93.8 |
| 1000 | 18 | 7.5 | 86.3 |
| 710 | 25 | 20.8 | 65.5 |
| 500 | 35 | 21.0 | 44.4 |
| 425 | 40 | 9.1 | 35.4 |
| 355 | 45 | 8.8 | 26.5 |
| 300 | 50 | 6.8 | 19.7 |
| 212 | 70 | 9.3 | 10.5 |
| 180 | 80 | 2.7 | 7.8 |
| 150 | 100 | 2.1 | 5.7 |
| 75 | 200 | 3.3 | 2.5 |
| 10 | Pan | 2.4 | |
| | | 100.0 | |

*FIG. 3C*

| cumulative distribution | | (laser diffraction) | |
|---|---|---|---|
| Microns | % Passing | Microns | % Passing |
| 3500 | 100 | 210 | 10.27 |
| 2940 | 100 | 180 | 7.81 |
| 2450 | 99.99 | 150 | 5.73 |
| 2050 | 99.94 | 120 | 4.07 |
| 1740 | 99.80 | 100 | 3.22 |
| 1450 | 98.91 | 86 | 2.75 |
| 1220 | 95.34 | 74 | 2.41 |
| 1020 | 87.51 | 62 | 2.12 |
| 850 | 77.47 | 52 | 1.90 |
| 720 | 66.40 | 44 | 1.72 |
| 600 | 55.24 | 36 | 1.53 |
| 500 | 44.43 | 30 | 1.39 |
| 420 | 34.74 | 26 | 1.26 |
| 350 | 27.15 | 22 | 1.14 |
| 300 | 19.71 | 18 | 0.99 |
| 250 | 14.11 | | |

*FIG. 3D*

USE OF EDIBLE-OIL-PROCESSING SPENT BLEACHING EARTH IN FORMULATING POULTRY AND LIVESTOCK FEED PRODUCTS

CROSS-REFERENCE TO RELATED APPLICATIONS

This is a National Phase Application under 35 U.S.C. § 371 of PCT/US2016/020969 filed on Mar. 4, 2016, which claims priority under 35 U.S.C. § 119 to provisional application Ser. No. 62/129,078, filed Mar. 6, 2015, herein incorporated by reference in its entirety.

FIELD OF THE INVENTION

The present invention relates to the safe handling, disposal, and economic use of spent bleaching earth from edible oil processing by feed-grade lime (calcium carbonate) addition to make products for poultry and livestock.

BACKGROUND OF THE INVENTION

Spent bleaching earth is a solid waste material generated as part of the refining process in the vegetable oil industry worldwide. A minimum of 112 million pounds of bleaching earth (clay) are used per year in the United States alone for edible vegetable oil processing. A typical vegetable oil refining process involves pretreatment of crude vegetable oil with acid and/or caustic soda followed by bleaching and deodorization.

Bleaching is a process of adsorbing impurities. The most common adsorbent used for bleaching is the bleaching earth or clay. In edible oil refining, the bleaching process is generally considered to be of critical importance in determining the quality and stability of the final product. Although bleaching was originally intended for the removal of coloring substances from the oil, it is now recognized that this process is responsible for the removal of a whole range of impurities. Besides decolorization, the most important purpose of this bleaching process is the removal of trace elements such as iron, copper, calcium, magnesium, nickel, and phosphorus, some of which are known to promote oxidation of the oil and to limit the storage stability of the oil if they are not removed.

The bleaching process is followed by deodorization, which is intended primarily for the removal of traces of constituents that cause flavors and odors. Subsequently, the treated oil is separated from the bleaching earth by filtration. In order to minimize oil losses, the filter cake resulting from the removal of bleaching earth from the oil stream is commonly blown with steam. By weight, oil retention of spent bleaching earth from edible oil processing ranges between about 30-50% entrained edible oil. Thus, there is about 50-70% clay. The edible oil has significant nutritional value for livestock. At a 30% retention level, about 33.6 million pounds per year of edible oil is lost in the spent clay. While the clay component is inert, it is not harmful for ingestion. This is reflected by the fact that clay is added to soybean protein meal as a flow agent for animal feed.

Disposal of spent bleaching clay has been and continues to be a problem due to the spontaneous combustion of the material. With the thin film of oil on the massive surface area of the clay particles, air exposure results in rapid oxidation and generation of sufficient heat to ignite the oil. To avoid this hazard, the most common disposal method is to haul the spent bleaching earth to a landfill site or land farm and immediately cover it with earth to prevent the rapid oxidation. For both solid waste disposal sites and land farming applications, the spent bleaching earth must be immediately covered or adequately mixed with soil upon receipt to exclude contact with air and prevent spontaneous combustion.

Disposal of spent bleaching earth in landfills is not ideal and presents problems. This disposal method is expensive and results in no economic benefit from the oil component. Additionally, there are environmental concerns with the continued use of landfills. Finally, the necessity to dispose of the spent bleaching earth within 24 hours is problematic with respect to safety, transportation, and timing. As a result, many attempts to find a safe and economic use for spent bleaching earth have been contemplated. For over fifty years, numerous ideas for economic utilization of the spent bleaching earth have been explored including inclusion in some liquid animal feeds. These methods have not proven to be satisfactory because of the spontaneous combustion hazard in handling. Furthermore, these methods have not been able to dispose of spent bleaching earth on a large scale and for a sustained period.

Other attempts have included efforts to regenerate the spent bleaching earth by controlling the oxidation, and thereby the temperature due to ignition of the spent bleaching earth, within a fluidized bed. See U.S. Pat. No. 5,256,613. However, regeneration of the spent bleaching earth presents other problems, such as the expense of purchasing and training personnel to operate stationary fluidized beds capable of withstanding temperatures around, or in excess of, about 1000° C. Another problem is that regeneration does not necessarily avoid environmental pollution as the gases released from the combustion may include heavy metals and other pollutants. Therefore, attempts to regenerate spent bleaching earth on a large scale may present high costs due to equipment purchases and pollution controls.

Accordingly, it is an object of the invention to provide a safe method for disposing of spent bleaching earth.

Additionally, it is an object of the invention to provide a method for disposing of spent bleaching earth where the spent bleaching earth is not deposited in a landfill.

A further object of the invention is to provide a method for large scale disposal of spent bleaching earth that avoids the existing problems and concerns.

A further object of the invention is to provide a method for disposing of spent bleaching earth where the spent bleaching earth can be profitably reused for another application.

A further object of the invention is to provide a method for disposing of spent bleaching earth that uses the spent bleaching earth to create a high-demand feed ingredient for poultry and livestock.

A further object of this invention is to incorporate spent bleaching earth in the feed ingredient at weight percentages up to a maximum of 95%.

SUMMARY OF THE INVENTION

The present invention provides a novel method for disposing of spent bleaching earth that is economically beneficial and avoids the problems typically associated with its disposal. The present invention prevents spontaneous combustion of the spent bleaching earth beyond the 24-hour safe period to provide more time for economic utilization in a stable product. By adding fine-particle lime (calcium carbonate) to the spent bleaching earth discharged from the process filters, spontaneous combustion can be eliminated. The material can then be transported in solid form to a production facility for use as a nutritious ingredient in making a wide range of feed products for poultry and livestock. Optionally, other additives may also be included in the mixture.

In a preferred embodiment of the invention, the spent bleaching earth is safely disposed of by mixing it with a fine-particle lime (calcium carbonate) to prevent spontaneous combustion and simultaneously or subsequently mixing it with other feed ingredients to make the final poultry or livestock feed product. In another aspect of the invention the spent bleaching earth is present in the initial formulation up to a maximum of 95 wt % and lime (calcium carbonate) component is present at a minimum of 5 wt %. In yet another aspect of the invention, the formulation may contain additional ingredients to support poultry and livestock nutrition and health needs by taking advantage of the preservative attributes of lime.

BRIEF DESCRIPTION OF THE DRAWINGS

FIGS. 3A-3D depict the properties of food-grade lime used to blend with spent bleaching earth.

DETAILED DESCRIPTION OF THE PREFERRED EMBODIMENTS

Figure 1:
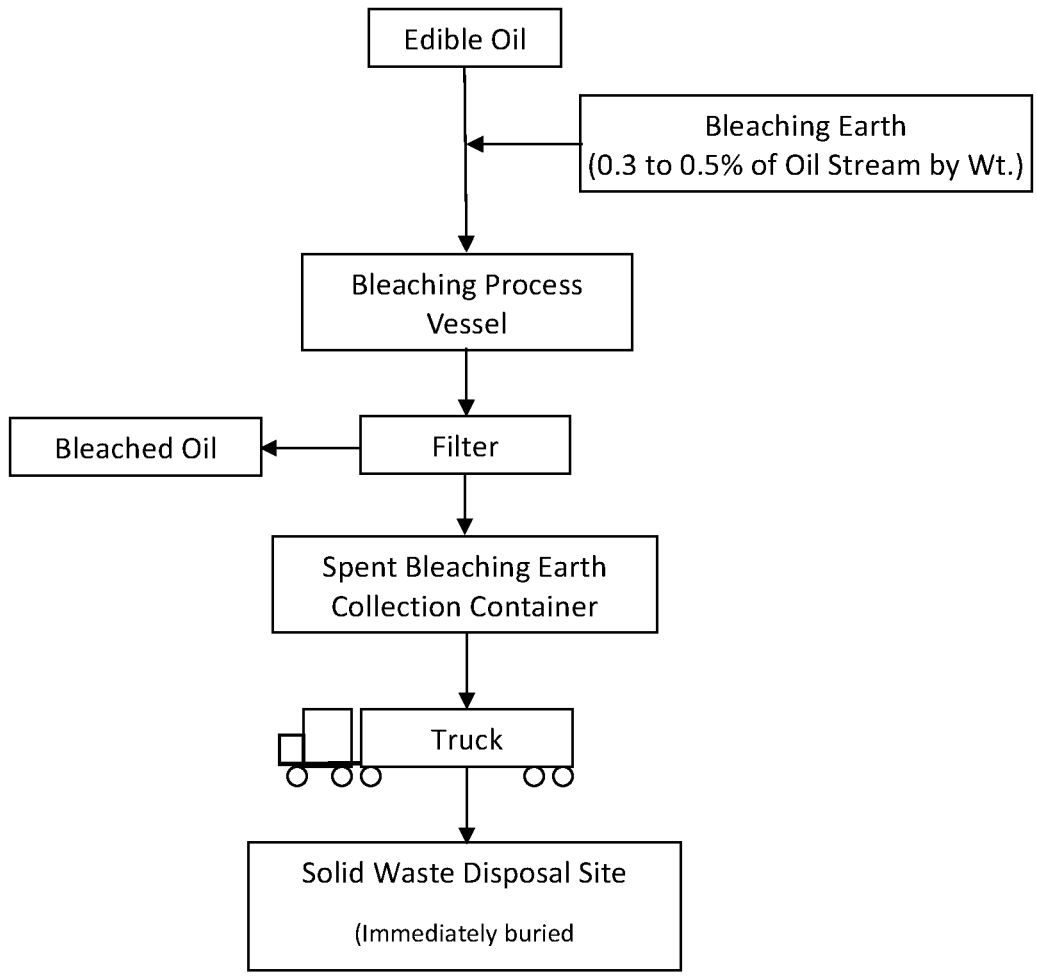
FIG. 1 is a flowchart illustrating the present dominant method for the disposal of spent edible oil bleaching earth.
Figure 2:
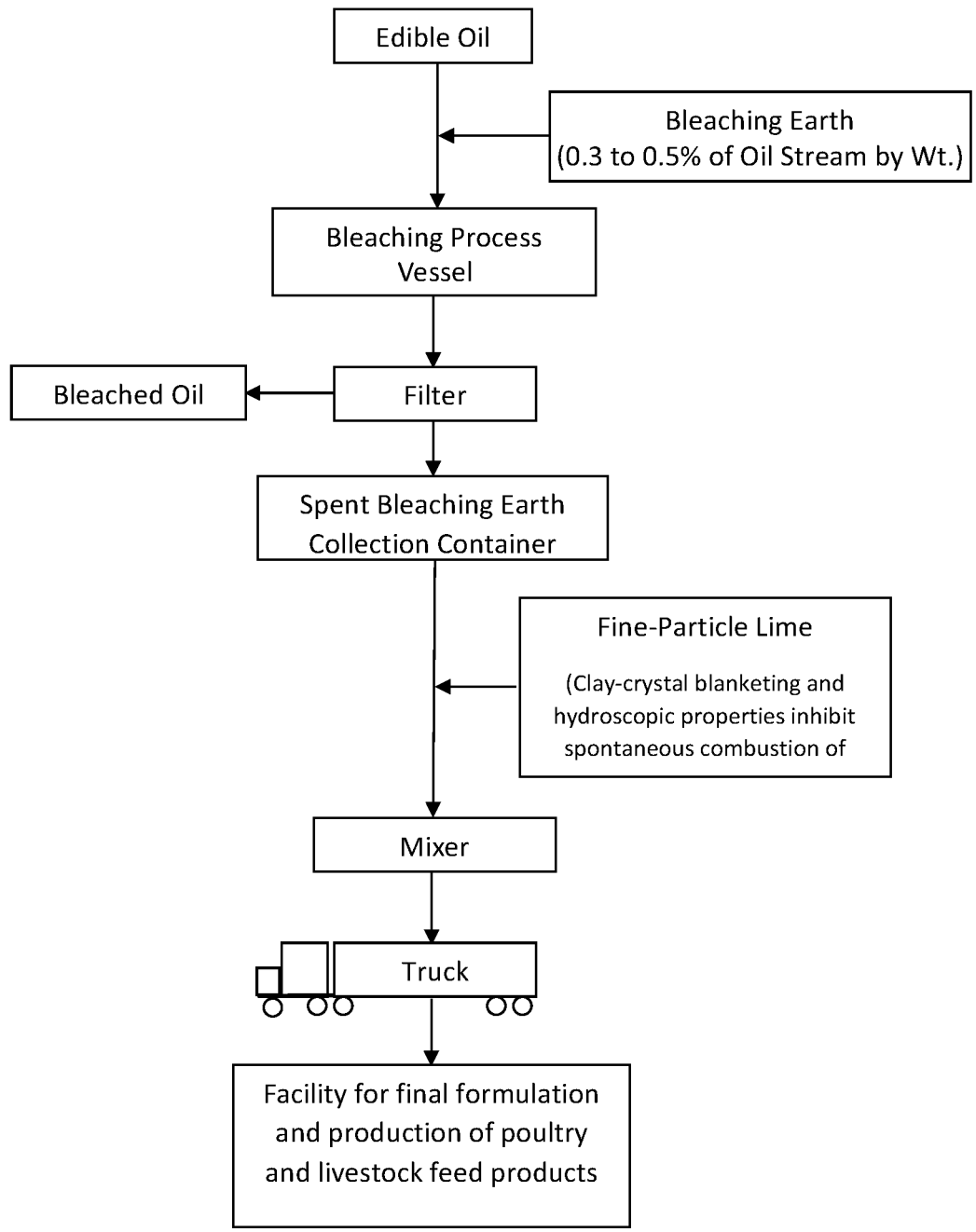
FIG. 2 is a flowchart illustrating the invention methods for utilizing spent edible oil bleaching earth to make a high-demand poultry and livestock feed ingredient by blending with fine-particle lime (calcium carbonate).
Figure 3A:
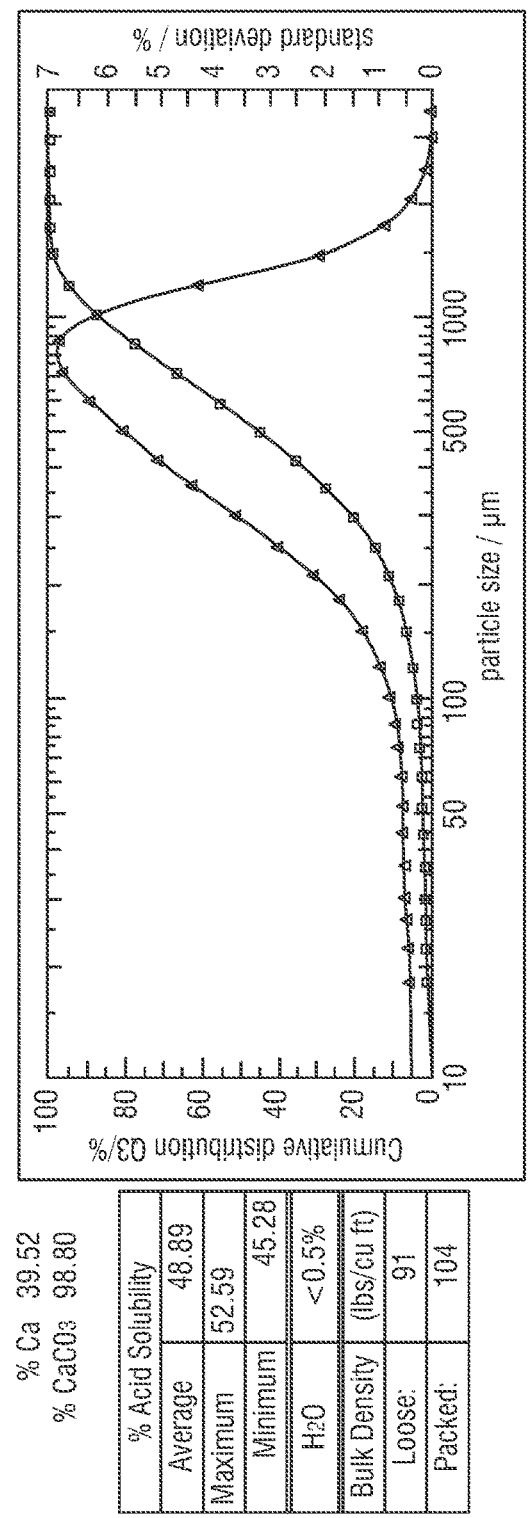

The embodiments of this invention are not limited to particular poultry and livestock feed compositions and methods of use thereof, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in their SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below. The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The terms "weight percent," "wt-%," "wt %" "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

Poultry and Livestock Feed Ingredients

It is common to feed poultry and livestock lipids and lime (calcium carbonate) to improve nutrition and health. It is well-known that animal growth and fertility is limited by the level of nutrients in the feed available for consumption.

Lipids and lime are particularly desirable in feed supplements; however, lipids have been difficult to incorporate. Lipids are often in liquid form or some form that exudes or sweats liquid oil and/or grease, particularly in warm temperatures. Thus, lipids can become rancid and decompose. This has greatly limited the manner in which lipids can be fed to animals and stored. Furthermore, when mixed with grains or other dry feed products, lipids not only risk going rancid but can also clump or agglomerate, and thereby disperse non-uniformly in typical feeding mechanisms. This results in packaging, handling, and rationing problems. As many livestock live in warm climates, these problems have greatly limited the incorporation of lipids in livestock diets and has minimized the formulations, mass distribution, and use of lipids in feed supplements.

Clays such as montmorillonite have previously been incorporated into poultry feed at levels as low as one percent of the animal ratio as in U.S. Pat. No. 3,687,680. Effects accompanying the addition of montmorillonite included increased growth rate and body weight of the chickens and reduced mortality rate. Attapulgite clay has also been incorporated in feed blocks at the levels of 2-6%, as in U.S. Pat. No. 4,735,809. In one study, spent bleaching clay, specifically bentonite, was incorporated into poultry feed pellets and the researchers found that "[u]p to 7.5% spent clay could be included successfully in the diet with no deleterious effects." Blair, R. et al, Poultry Science, 1986 Vol. 65, pp. 2281-2291. The study concluded that "spent bleaching clay could be added to poultry feed at 0.5 to 2% clay." Id. Another study concluded that "up to 4% spent bleaching clay could be included in natural ingredients diets without either beneficial or harmful effects to growing mice or rats." Keith, M. O. et al, Can. J. Anim. Sci., 1986 Vol. 66, pp. 191-199. Despite the findings that spent bleaching earth may be incorporated in animal feed products, there have not been any successful attempts to use spent bleaching earth at higher percentages, such as above 10%>, in animal feed products. Furthermore, there have been no successful attempts to incorporate spent bleaching earth in feed products.

Compositions of the Invention

According to the invention a novel method for disposing of spent bleaching earth is disclosed which is economically beneficial and avoids the problems typically associated with its disposal. By adding fine-particle lime (calcium carbonate) to the spent bleaching earth discharged from the process filters, spontaneous combustion can be eliminated. The material can then be transported in solid form to a production facility for use as a nutritious ingredient in making a wide range of feed products for poultry and livestock.

Spent Bleaching Earth

The terms "spent bleaching earth," "spent bleaching clay," "edible oil bleaching earth," "edible oil bleaching clay," and variations thereof, as used herein, refer to spent bleaching earth resulting from the production of edible vegetable oil, i.e., oils used chiefly in foodstuffs. Examples of preferred spent bleaching earth are: attapulgite, bentonite, montmorillonite, Na-montmorillonite, Ca-montmorillonite, Na-bentonite, Ca-bentonite, beidellite, nontronite, saponite, hectorite, and combinations thereof. Typical attributes of edible oil bleaching earth are presented in Table 1.

Lime (Calcium Carbonate) Component

Standard Specification for Limestone for Animal Feed Use: ASTM C706-13. Lime is the most common source of calcium used in livestock feeding. It is almost pure calcium carbonate. Calcitic limestone contains 36-38% calcium and can safely be fed free choice. Dolomitic limestone contains at least 5% magnesium carbonate and should not be used for poultry, but it is as good as calcitic limestone for other animals. Portland and natural cement can be used instead of limestone.

TABLE 1

| Physical Properties | |
| --- | --- |
| Apparent Bulk Density (g/cc) | 0.99 |
| Free Moisture (5) [2 hours, 110° C.] | 10 to 12 |
| Loss on Ignition (5) [pre dired for 2 hours at 1,000° C.] | 6 to 8 |
| Ph [10% suspension filtered] | 5 to 5.3 |
| Acidity (mg KOH, g) | <1 |
| Surface Area (m2/g) | 210 |
| Micro Pore Volume 0-80 nm (mg/l) | 0.46 |
| Chemical Analysis (Mineral Composition by Percentage) | |
| Silicon Oxide | 64 |
| Aluminum Oxide | 16 |
| Iron (III) Oxide | 1.20 |
| Magnesium Oxide | 2.10 |
| Calcium Oxide | 1.20 |
| Sodium Oxide | 0.00 |
| Loss on Ignition (5) | 7.90 |
| Others | 7.60 |
| Particle Size Distribution (Based on Standard Screen Sizes) | |
| 100 | 2 |
| 200 | 9 |
| 240 | 21 |
| 300 | 18 |
| 350 | 12 |
| −350 | 38 |

Source: Fuller's Earth (Clay), Activated Edible Oil Bleaching

Traditional Feed Ingredients

In one aspect, the animal feed, comprises forage and may further comprise concentrates as well as vitamins, minerals, enzymes, amino acids and/or other feed ingredients (incorporated from e.g. a premix). Such an animal feed is generally suitable for ruminants, such as sheep, goats, and cattle etc. In another aspect, the animal feed, comprises concentrates and may further comprise vitamins, minerals, enzymes, amino acids and/or other feed ingredients (incorporated from e.g. a premix) and optionally forage. Such an animal feed is generally suitable for non-ruminants, such as pigs and poultry etc.

Thus another aspect of the invention is a method for preparing an animal feed composition, comprising mixing spent bleaching earth with one or more animal feed ingredients selected from the list.

Forage

Forage as defined herein also includes roughage. Forage is fresh plant material such as hay and silage from forage plants, grass and other forage plants, grass and other forage plants, seaweed, sprouted grains and legumes, or any combination thereof. Examples of forage plants are Alfalfa (lucerne), birdsfoot trefoil, brassica (e.g. kale, rapeseed (canola), rutabaga (swede), turnip), clover (e.g. alsike clover, red clover, subterranean clover, white clover), grass (e.g. Bermuda grass, brome, false oat grass, fescue, heath grass, meadow grasses, orchard grass, ryegrass, Timothy-grass), corn (maize), millet, barley, oats, rye, sorghum, soybeans and wheat and vegetables such as beets. Crops suitable for ensilage are the ordinary grasses, clovers, alfalfa, vetches, oats, rye and maize. Forage further includes crop residues from grain production (such as corn stover; straw from wheat, barley, oat, rye and other grains); residues from vegetables like beet tops; residues from oilseed production like stems and leaves form soy beans, rapeseed and other legumes; and fractions from the refining of grains for animal or human consumption or from fuel production or other industries. Roughage is generally dry plant material with high levels of fiber, such as fiber, bran, husks from seeds and grains and crop residues (such as stover, copra, straw, chaff, sugar beet waste).

Optional Ingredients

The animal feed supplement mixture may also include other optional ingredients.

Optionally, other edible fats may be added to the mixture. Optional edible fat sources include, but are not limited to, fatty acids (e.g., stearic, palmitic, oleic, linoleic, and lauric acid), complex lipids (e.g., phospholipids). Sources of edible fats may include, but are not limited to, coconut oil, corn oil, cottonseed oil, fish oil, olive oil, palm oil, sesame oil, soybean oil, canola oil, sunflower seed oil, tallow, greases, beef fat, restaurant fats, and mixtures thereof.

Optionally, other feedstuffs may be added to the mixture, including but not limited to, cottonseed meal, soy bean meal, mill run, lupins, molasses, dunder, other molasses byproducts (dried); grains, cereals, legumes, straw, hay, soy flakes, dried alfalfa, soy meal, wheat middlings, corn; barley meal, blood meal, dried buttermilk, linseed meal, meat and bone meal, peanut meal, rice meal, and sunflower meal.

Optionally, dietary nitrogen may be included in the mixture. Optional dietary nitrogen sources include, but are not limited to, ammonia, ammonium polyphosphate, animal protein products, oilseed meals, synthetic amino acids, and urea.

Optionally, various vitamins may be added to the mixture. Examples of such vitamins include, but are not limited to, vitamins A, E, K, and the B group vitamins.

Optionally, various trace minerals and elements may be added to the mixture. Examples of such trace minerals and elements include, but are not limited to, cobalt sulfate, copper sulfate, ferrous sulfate, ferrous oxide, iodines, manganese sulfate, potassium iodate, selenium and its compounds, sulphur, zinc oxide, and zinc sulfate, etc.

Optionally, various drugs, medicaments, insecticides, enzymes, antimicrobials, probiotics and the like may be added to the mixture.

Depending on the optional ingredients added, it may be beneficial to include optional emulsifying agents to stabilize the composition and prevent separation of the mixture, particularly of the fat ingredient(s). A preferred, although not exclusive, example of emulsifying agents are colloidal clay gellants, such as, attapulgite, bentonite, and sepiolite. One of skill in the art will be familiar with the use of emulsifying agents, including when they are helpful and how to incorporate them.

The invention is intended as a feed supplement for any livestock animal and can also include companion animal feed such as dogs or cats, as well as traditional livestock animals including both beef and dairy cattle, pigs, sheep, goats, horses, mules, asses, buffalo, and camels; as well as poultry: chickens, turkeys, ducks, geese, guinea fowl, and squabs and the like.

Preparation of the Mixture

A mixture is prepared of spent bleaching earth, containing about 30-50 wt % oil, and a lime (calcium carbonate) component. The spent bleaching earth may be present up to a maximum of 95 wt %. The lime (calcium carbonate) component is present at minimum of 5 wt %. Any suitable mixer can be used to combine and thoroughly mix the ingredients. Examples of suitable mixers include, but are not limited to, variable-speed shop drill motors with a mixer bit, paddle-mixers, etc. One of skill in the art will be familiar with various mixers and can select an appropriate mixer for their particular production needs. Once thoroughly mixed, the mixture is transferred holding container for subsequent disposition; bulk transport or packaging.

Additionally, the lipid content in the spent bleaching clay has health benefits for the livestock. In cases where livestock producers have leased pasture land to edible oil processors for disposal of spent bleaching earth, it has been observed that cattle.

Example 1

Spontaneous Combustion Suppression Tests

Spontaneous combustion suppression tests were conducted to ensure that the hazards associated with the combustion of spent bleaching earth were eliminated. The tests were conducted as discussed below and the data from the tests is contained in Tables 2 and 3.

Five pound samples of spent bleaching earth containing about 30% oil by weight were mixed with the fine-particle lime component as presented in Table 3, and under the procedures described below.

TABLE 2

Spontaneous Combustion Suppression Test Formulations

| Amount of Spent Bleaching Earth (Pounds) | Weight Percentage of Lime (Calcium carbonate) | Lime (Calcium Carbonate) Physical Properties |
|---|---|---|
| 5 | 0 (Reference) | None |
| 5 | 5 | Dry Fine-Particle |
| 5 | 6 | Dry Fine-Particle |
| 5 | 7 | Dry Fine-Particle |
| 5 | 8 | Dry Fine-Particle |

All of the five-pound samples were placed outside on a gravel roadway in the direct sunlight for five days. To retain the heat produced from oil oxidation and protect the samples from moisture, the sample bags were closed and tied at the end of each test day and opened again each morning. The temperature of each sample was taken by means of a non-contact infrared thermometer. The temperature recordings are provided in Table 3 by sample.

TABLE 3

Temperature Profile of Spent Bleaching Earth Samples with a Range of Lime (Calcium Carbonate) Addition over a Five-Day Observation Period
Temperature (° F.)

|  | Date | | | | | | | | | |
|---|---|---|---|---|---|---|---|---|---|---|
|  | 08/03 | | 08/04 | | 08/05 | | 08/06 | | 08/07 | |
|  | Time | | | | | | | | | |
|  | 1100 | 1500 | 1100 | 1500 | 1100 | 1500 | 1100 | 1500 | 1100 | 1500 |
| Reference Sample (0% Lime) | 120 | 132 | 156 | 169 | 171 | 172 | 174 | 176 | 178 | 181 |
| Sample with 5% Lime | 118 | 120 | 123 | 129 | 132 | 134 | 132 | 129 | 127 | 126 |
| Sample with 6% Lime | 116 | 118 | 121 | 126 | 131 | 133 | 130 | 128 | 126 | 124 |
| Sample with 7% Lime | 114 | 117 | 119 | 124 | 127 | 130 | 129 | 127 | 125 | 123 |
| Sample with 8% Lime | 112 | 114 | 118 | 122 | 125 | 129 | 127 | 125 | 123 | 121 |
| High Ambient Temperature (° F.) | 97 | | 97 | | 96 | | 97 | | 98 | |
| Low Ambient Temperature (° F.) | 68 | | 72 | | 74 | | 74 | | 73 | |

In the combustion suppression test, none of the spent bleaching earth samples exhibited any visible ignition over the five-day test period. The reference sample did reach a maximum temperature of 181° F. on the fifth day of observation. A color change from yellow-tan to brown with some ashen-colored spots appeared. Evidence of sample smoldering was observed. For samples containing lime, the highest sample temperature recorded was 134° F. on the third day of observation. This sample had been treated with 5% by weight of dry lime. With lime being hydroscopic, moisture is absorbed from the air to aid in keeping the spent bleaching earth cool.

Thus, the addition of the fine-particle lime component to the spent bleaching earth prevents significant increases in the temperature of the spent bleaching earth and eliminates the problem of spontaneous combustion.

Spent bleaching earth was disposed of according to the methods disclosed herein. An animal nutritional feed ingredient was produced as discussed below. The ingredient produced for test is not to be deemed as an exclusive embodiments of the methods for disposing of spent bleaching earth, methods of producing the animal nutritional supplements, or compositions of animal nutritional supplement, disclosed herein.

One hundred pounds of test ingredient were produced by mixing 92 pounds of spent bleaching earth with 8 pounds of fine particle lime.

Example 2

Formulation of Poultry Feed Product for Test

The test ingredient made from mixing spent bleaching earth (SBE) with lime was used to make a poultry feed for trial using the following formulation:

| Component | % |
|---|---|
| SBE and lime ingredient | 20 |
| Alfalfa meal | 35 |
| Ground corn | 35 |
| Oats | 10 |
| TOTAL | 100 |

The product was successfully fed to layer hens for three months.

What is claimed is:

1. A poultry feed composition comprising:
    80% by weight of a poultry feedstuff, wherein the poultry feedstuff comprises 43.75% by weight alfalfa, 43.75% by weight corn, and 12.5% by weight oats; and
    20% by weight of a spent bleaching earth component, wherein the spent bleaching earth component comprises 8% by weight of calcium carbonate; and 92% by weight of spent bleaching earth, wherein the spent bleaching earth comprises bentonite and 30% by weight edible oil;
    wherein the spent bleaching earth has been treated with the calcium carbonate prior to adding to the poultry feedstuff to form the spent bleaching earth component.

2. The feed composition of claim 1, wherein the spent bleaching earth further comprises a clay selected from the group consisting of attapulgite, montmorillonite, Na-montmorillonite, Ca-montmorillonite, beidellite, nontronite, saponite, hectorite, or combinations thereof.

3. The composition of claim 1, wherein the spent bleaching earth further comprises attapulgite.

4. The feed composition of claim 1, wherein the spent bleaching earth is from production of edible vegetable oil.

5. The feed composition of claim 1, wherein the feed composition is not spontaneously combustible at atmospheric temperatures.

6. The feed composition of claim 1, wherein the poultry feedstuff further comprises a feedstuff ingredient selected from the group consisting of cottonseed meal, soy bean meal, mill run, lupins, molasses, molasses byproducts, dunder, grains, cereals, legumes, straw, hay, soy flakes, soy meal, wheat middlings, barley meal, blood meal, dried buttermilk, linseed meal, meat and bone meal, peanut meal, rice meal, sunflower meal, or combinations thereof.

7. The feed composition of claim 1, wherein the feed composition further comprises an ingredient selected from the group consisting of vitamins, minerals, enzymes, amino acids, or combinations thereof.

* * * * *